(12) United States Patent
Katzri et al.

(10) Patent No.: US 12,155,572 B2
(45) Date of Patent: Nov. 26, 2024

(54) NETWORK DEVICE THAT UTILIZES TCAM CONFIGURED TO OUTPUT MULTIPLE MATCH INDICES

(71) Applicant: Marvell Israel (M.I.S.L) Ltd., Yokneam (IL)

(72) Inventors: Yaron Katzri, Ness-Ziona (IL); Yaron Kittner, Pardes Hanna-Karkur (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

(21) Appl. No.: 17/886,375

(22) Filed: Aug. 11, 2022

(65) Prior Publication Data
US 2023/0052252 A1 Feb. 16, 2023

Related U.S. Application Data

(60) Provisional application No. 63/232,475, filed on Aug. 12, 2021.

(51) Int. Cl.
| | |
|---|---|
| *G06F 12/00* | (2006.01) |
| *H04L 45/00* | (2022.01) |
| *H04L 45/745* | (2022.01) |
| *H04L 69/22* | (2022.01) |

(52) U.S. Cl.
CPC ........ *H04L 45/74591* (2022.05); *H04L 45/54* (2013.01); *H04L 69/22* (2013.01)

(58) Field of Classification Search
CPC ... H04L 45/74591; H04L 45/54; H04L 69/22; H04L 45/745; H04L 45/7457; H04L 12/5689; G06F 17/30982
See application file for complete search history.

(56) References Cited

U.S. PATENT DOCUMENTS

| | | | |
|---|---|---|---|
| 5,905,870 | A | 5/1999 | Mangin |
| 6,035,333 | A | 3/2000 | Jeffries |
| 7,848,128 | B2 | 12/2010 | Arsovski et al. |
| 7,859,877 | B2 | 12/2010 | Mondaeev |
| 7,961,489 | B2 | 6/2011 | Mondaeev et al. |

(Continued)

FOREIGN PATENT DOCUMENTS

| | | |
|---|---|---|
| CN | 103945431 A | 7/2014 |
| CN | 107026716 A | 8/2017 |

OTHER PUBLICATIONS

International Search Report and Written Opinion for PCT Application No. PCT/IB2022/000454 mailed Nov. 18, 2022. (15 pages).

*Primary Examiner* — Shawn X Gu

(57) ABSTRACT

A network device provides a search key corresponding to a packet to a TCAM. The TCAM determines that the search key matches one or more search patterns stored in the TCAM. The network device selects one search pattern among the one or more search patterns at least by analyzing respective priority information associated with the one or more search patterns. The respective priority information indicates one or more respective priority levels that are independent from one or more physical locations of the one or more search patterns within the TCAM. In connection with selecting the one search pattern, the network device determines one or more actions to be performed on the packet by the network device, the one or more actions corresponding to the selected one search pattern.

21 Claims, 5 Drawing Sheets

(56) References Cited

U.S. PATENT DOCUMENTS

| | | |
|---|---|---|
| 8,018,851 B1 | 9/2011 | Medina |
| 8,176,242 B1 | 5/2012 | Shamis et al. |
| 8,233,302 B2 | 7/2012 | Arsovski et al. |
| 8,301,604 B1 | 10/2012 | Anker et al. |
| 8,468,296 B1 | 6/2013 | Cohen |
| 8,571,035 B2 | 10/2013 | Kopelman et al. |
| 8,599,859 B2 | 12/2013 | Pais et al. |
| 8,995,277 B2 | 3/2015 | Anand |
| 9,159,420 B1 | 10/2015 | Wohlgemuth |
| 9,177,646 B2 | 11/2015 | Arsovski |
| 9,262,312 B1 | 2/2016 | Gazit et al. |
| 9,306,851 B1 | 4/2016 | Gazit et al. |
| 9,424,366 B1 | 8/2016 | Gazit et al. |
| 9,438,527 B2 | 9/2016 | Shamis et al. |
| 9,537,771 B2 | 1/2017 | Arad et al. |
| 9,704,574 B1 | 7/2017 | Shamis |
| 9,819,637 B2 | 11/2017 | Roitshtein et al. |
| 9,997,245 B1 | 6/2018 | Levy et al. |
| 10,917,349 B2 | 2/2021 | Leib |
| 2004/0088451 A1 | 5/2004 | Han |
| 2005/0226235 A1* | 10/2005 | Kumar ............... H04L 47/2441 370/386 |
| 2006/0092837 A1 | 5/2006 | Kwan |
| 2006/0092845 A1 | 5/2006 | Kwan |
| 2009/0259811 A1* | 10/2009 | Krishnan .......... G06F 16/90339 365/49.1 |
| 2013/0250762 A1 | 9/2013 | Assarpour |
| 2015/0039823 A1 | 2/2015 | Chen |
| 2019/0236103 A1 | 8/2019 | Bosshart et al. |
| 2020/0228449 A1 | 7/2020 | Shmilovici Leib |
| 2020/0351200 A1 | 11/2020 | Sheldon et al. |

\* cited by examiner

NETWORK DEVICE THAT UTILIZES TCAM CONFIGURED TO OUTPUT MULTIPLE MATCH INDICES

CROSS REFERENCES TO RELATED APPLICATIONS

This application claims the benefit of U.S. Provisional Patent Application No. 63/232,475, entitled "Inline Ternary Contact Addressable Memory (TCAM) Priority," filed on Aug. 12, 2021, the disclosure of which is hereby expressly incorporated herein by reference in its entirety.

FIELD OF TECHNOLOGY

The present disclosure relates generally to network devices used in communication networks, and more particularly to ternary content addressable memories (TCAMs) used in network devices for identifying patterns in headers of packets.

BACKGROUND

Network devices such as network switches, routers, bridges, etc., often use ternary content addressable memories (TCAMs) to recognize known patterns within header information of packets being processed by the network device, and, optionally, within metadata associated with the packets, such as an identifier of a port that received the packet, etc. For example, some network devices use a TCAM to classify packets to known packet flows based on known patterns of header information and, optionally, metadata associated with packets. As another example, some network devices use a TCAM to make forwarding decisions based on known patterns of header information and, optionally, metadata associated with packets.

Typically, a search key for a packet is generated using selected header fields of the packet and, optionally, selected metadata corresponding to the packet, and then the search key is input to the TCAM. Whenever the TCAM detects that the search key matches a pattern stored in the TCAM, the TCAM outputs an index that indicates the pattern that matches the search key. Typically, the index output by the TCAM points to a location in another memory, such as a random access memory (RAM), that stores information indicating one or more actions to be taken in connection with the packet (sometimes referred to herein as "rules"). Examples of rules include classifying the packet as belonging to a particular packet flow, classifying the packet as belonging to a particular virtual local area network (VLAN), forwarding the packet to a particular set of one or more ports of the network device, determining that a particular tunneling header is to be added to the packet, etc.

A feature of TCAMs is that one or more portions of a search pattern can be designated as "don't care," where portions marked as "don't care" do not need to match a search key in order for the TCAM to return determine a match result. As a simple illustrative example, a stored word of "01XX0" in a TCAM, with "X" indicating a "don't care" bit, will match any of the search keys "01000", "01010", "01100", and "01110".

With the use of "don't care" bits, it is possible for a given search key to match multiple different patterns in a TCAM. Entries in conventional TCAMs typically are ordered and the TCAMs are designed to select a single matching entry from among multiple matches according to the ordering of entries. For instance, a match indication may be generated for a matching entry that is highest according to the ordering of entries.

SUMMARY

In an embodiment, a network device comprises: a packet processor configured to process packets communicated over a network, the processing including generating a search key representative of a packet, the search key including header information retrieved from the packet; and a lookup engine coupled to the processing processor. The lookup engine includes: a ternary content addressable memory (TCAM) configured to store a plurality of search patterns, the TCAM further configured to i) receive the search key from the processing engine, ii) compare the search key to the plurality of search patterns, and iii) in response to determining that the search key matches one or more search patterns stored in the TCAM, generate one or more indices corresponding to the one or more search patterns that match the search key; and a controller configured to: select one search pattern, from among the one or more search patterns, at least by analyzing respective priority information associated with the one or more search patterns, the respective priority information indicating one or more respective priority levels that are independent from one or more physical locations of the one or more search patterns within the TCAM, and in connection with selecting the one search pattern, retrieve from a memory separate from the TCAM a processing rule that corresponds to the one selected search pattern and provide the processing rule to the packet processor to process the packet according to the processing rule.

In another embodiment, a method for determining actions to be performed on packets by a network device includes: providing a search key corresponding to a packet to a TCAM; determining, by the TCAM, that the search key matches one or more search patterns stored in the TCAM; selecting, by the network device, one search pattern among the one or more search patterns at least by analyzing respective priority information associated with the one or more search patterns, the respective priority information indicating one or more respective priority levels that are independent from one or more physical locations of the one or more search patterns within the TCAM; and in connection with selecting the one search pattern, determining, by the network device, one or more actions to be performed on the packet by the network device, the one or more actions corresponding to the selected one search pattern.

DETAILED DESCRIPTION

Figure 1:
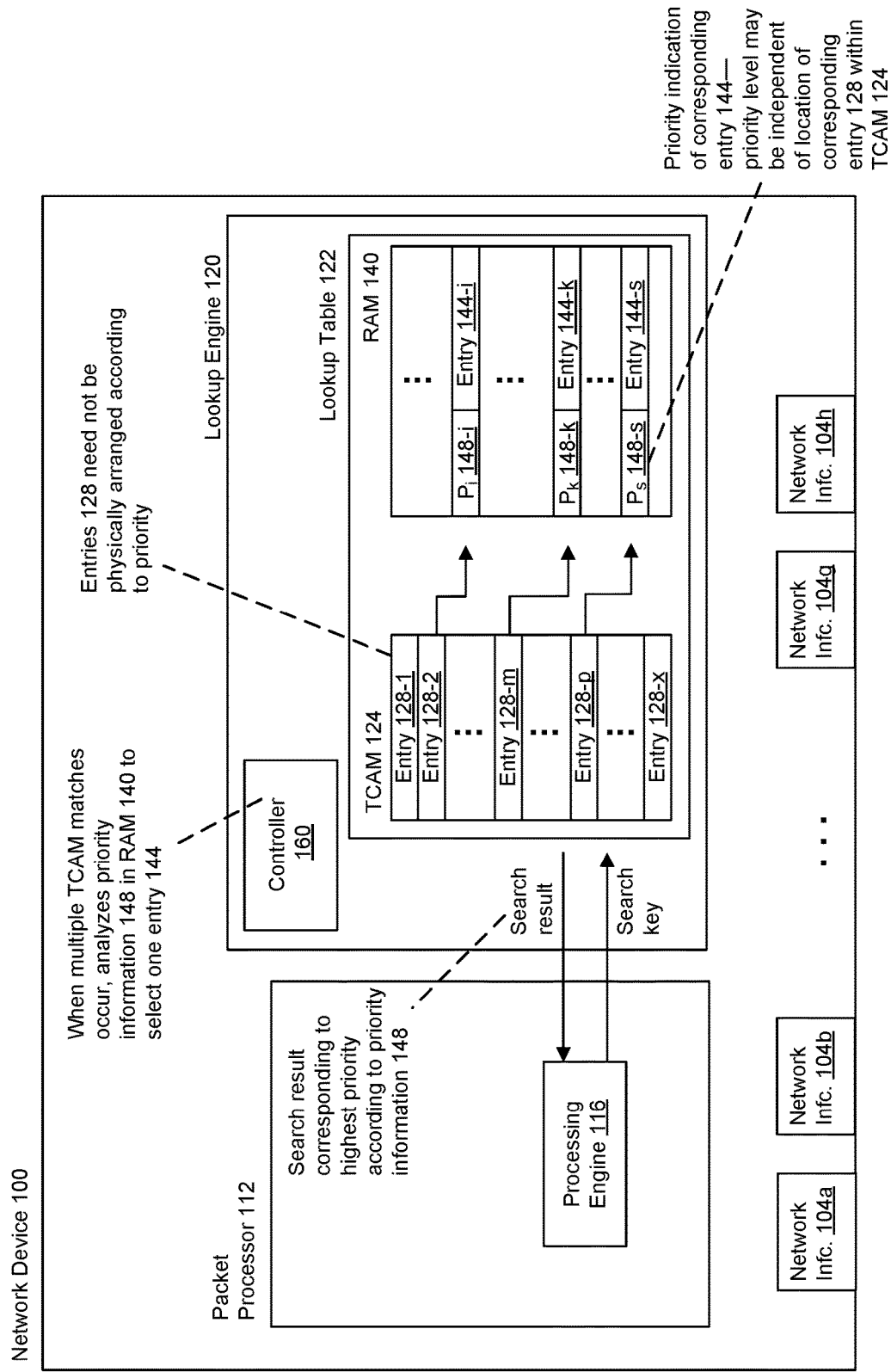
FIG. 1 is a simplified block diagram of an example network device that includes an example ternary content addressable memory (TCAM) that is configured to output multiple match indices when a search key matches multiple search patterns stored in the TCAM, according to an embodiment.

As discussed above, conventional ternary content addressable memories (TCAMs) are designed to search for matches according to an ordering of entries in the TCAM, and thus search patterns in the TCAM are ordered so that search patterns corresponding to higher priority rules are stored in higher TCAM entries (according to the ordering of entries) and search patterns corresponding to lower priority rules are stored in lower TCAM entries (according to the ordering of entries).

If a new search pattern corresponding to a high priority rule is to be stored in a TCAM that is relatively full, it may be necessary to move many other entries within the TCAM down (according to an ordering of entries) to make room for storing the new search pattern in a location in the TCAM that is relatively high in the ordering of entries. Similarly, if a new search pattern corresponding to a low priority rule is to be stored in a TCAM that is relatively full, it may be necessary to move many entries up (according to the ordering of entries) within the TCAM to make room for storing the new search pattern in a location in the TCAM that is relatively low in the ordering of entries.

As a result, the time required to insert a new search pattern in a conventional TCAM is unpredictable and can vary greatly between microseconds (when no other search patterns need to be relocated) to many seconds (when many patters need to be relocated), for example. The time required generally depends on a size of the TCAM, a fill level of the TCAM, and a distribution of search patterns in the TCAM.

In embodiments described below, a network device utilizes a lookup table having a TCAM that is configured to output multiple match indices when a search key matches multiple search patterns stored in the TCAM. Additionally, the lookup table stores priority information corresponding to the search patterns, the priority information indicating priority levels that are decoupled from physical locations of the search patterns within the TCAM. In an illustrative embodiment, the lookup table includes a separate memory that stores i) rule information corresponding to entries of the TCAM, and ii) priority information corresponding to the rule information and/or to entries in the TCAM. The lookup table further includes a match selection engine that is configured to, when a search key corresponding to a packet matches several search patterns in the TCAM, use priority information retrieved from the separate memory to select one of the search patterns independently of the locations of the multiple matching search patterns in the TCAM. The network device then uses rule information corresponding to the selected search pattern to process the packet. At least in some embodiments, the time required to add a new rule to such a lookup table typically is relatively short and predictable in comparison to conventional TCAM systems. For example, when the lookup table has free space, because priority is disengaged from the physical location of a rule in memory, a new rule can be added in a straightforward manner to an empty location in the TCAM without having to relocate other search patterns in the TCAM.

FIG. 1 is a simplified block diagram of an example network device 100 that receives packets, processes the packets to determine network links via which the packets are to be forwarded, and transmits the packets via the determined network links, according to an embodiment. The network device 100 includes a plurality of network interfaces 104 (e.g., ports, link aggregate groups (LAGs), tunnel interfaces, etc.) configured to couple to network links. In various embodiments, the network device 100 includes any suitable number of network interfaces 104.

The network device 100 also includes a packet processor 112 that is configured to process packets (e.g., by analyzing header information in the packets and, optionally, metadata associated with packets, such indicators of ports of the network device that received the packets, etc.), in an embodiment. The packet processor 128 includes a processing engine 116 that is coupled to a lookup engine 120. The processing engine 116 is configured use header information from a packet, and optionally metadata associated with the packet (e.g., an indicator of a port of the network device 100 that received the packet), to generate a search key and to provide the search key to the lookup engine 120. The lookup engine 120 is configured to perform a lookup in a lookup table 122. The lookup table 122 includes information that indicates actions to be performed by the network device 100 on packets received by the network device 100, such as classifying packet as belonging to particular packet flows, classifying the packets as belonging to particular virtual local area networks (VLANs), forwarding the packets to particular network interfaces 104, determining that particular tunneling headers are to be added to the packets, etc.

For example, the processing engine 116 is a forwarding engine and the lookup table 122 includes forwarding information, such a next hop internet protocol (IP) addresses and/or network interfaces 104 to which packets are to be forwarded, according to an embodiment. As another example, the processing engine 116 is a classification engine and the lookup table 122 includes classification information, such as flow identifiers (IDs) to be assigned to packets, according to another embodiment. As another example, the processing engine 116 is a classification engine and the lookup table 122 includes other types of classification information, such indicators of VLAN IDs to be added to packets, indicators of tunneling headers to be added to packets, indicators of actions to be taken on packets (e.g., drop the packet, send the packet to a central processing unit (not shown) for further processing, etc.), according to various embodiments. As another example, the processing engine 116 is a classification engine that applies access control list (ACL), rules to packets, and the lookup table 122 includes ACL information, according to another embodiment.

The processing engine 116 is configured to generate, for each of at least some packets received by the network device 100, a search key that includes header information from the packet, such as one or more fields from one or more headers of the packet. Optionally, the processing engine 116 is configured to generate the search key to also include metadata regarding the packet, such as an identifier of a port of the network device that received the packet.

The processing engine 116 is configured to provide the search key to the lookup engine 120.

The lookup table 122 comprises a TCAM 124 having a plurality of entries 128 storing search patterns. The search patterns correspond to known patterns of header information of packets and/or metadata associated with packets for which the packet processor is to perform corresponding processing actions. The lookup table 122 also comprises a separate memory 140, such as a random access memory (RAM) or another suitable memory. The RAM 140 includes a plurality of entries 144 that store rules associated with the search patterns stored in the TCAM 124. The rules in the RAM 140 indicate processing actions to be performed on packets that match respective search patterns stored in the TCAM 124. Each entry 144 of the RAM 140 also stores priority information 148. The priority information indicates a relative priority of the rule stored in the entry 144 with respect to other rules stored in other entries 144, in an embodiment. In another embodiment, the priority information indicates a relative priority of the search pattern in the TCAM that points to the entry 144 with respect to other search patterns in the TCAM that point to other entries 144. In an embodiment, each of at least some of the entries 144 includes i) a respective first field that stores respective rule information, and ii) a respective second field that stores respective priority information. Each second field includes a suitable number of bits. For example, a number of bits used for each second field is chosen based on a desired maximum number of priority levels to be supported by the lookup table 122, in an embodiment.

Values in the second fields within the entries 144 indicate respective priority levels of rules and/or search patterns, and the values in the second fields are independent of the physical locations of the corresponding search patterns in the TCAM 124, according to some embodiments. For example, although an index corresponding to a particular search pattern in the TCAM 124 points to a particular entry 144 within the RAM 140, the value of the priority information within the entry 144 is independent of the physical location of the particular search pattern within the TCAM 124.

The lookup engine 120 is configured to apply the search key received from the processing engine 116 as an input to the TCAM 124. When the TCAM 124 determines that the search key matches a single search pattern stored in the TCAM 124 in a single entry 128, the TCAM 124 outputs a single index that indicates the single entry 128. The single index output by the TCAM 124 corresponds to one of the entries 144 of the RAM 140, and the lookup engine 120 uses the index to retrieve the one entry 144 from the RAM 140. The one entry 144 includes a rule corresponding to the single entry 128 of the TCAM that matches the search key, and the lookup engine 120 is configured to provide to the processing engine 116 the rule that was retrieved from the one entry 144 of the RAM 140.

As discussed above, there will be instances where the search key matches multiple entries 128 of the TCAM 124, and the TCAM 124 is configured to determine whether the search key matches multiple entries 128 of the TCAM, at least in some embodiments. For example, FIG. 1 illustrates a scenario where a search key matches three entries: entry 128-2, entry **128-*m*, and entry 128-*p***.

When the TCAM 124 determines that the search key matches multiple entries 128, the TCAM 124 outputs multiple indices that that indicate respective entries 128 that match the search key. Each index output by the TCAM 124 corresponds to a respective entry 144 of the RAM 140. For example, FIG. 1 illustrates a scenario in which the entry 128-2 of the TCAM 124 corresponds to the entry **144-*i* of the RAM 140; the entry 128-*m* of the TCAM 124 corresponds to the entry 144-*k* of the RAM 140; and the entry 128-*p* of the TCAM 124 corresponds to the entry 144-*s* of the RAM 140**.

The lookup engine 120 is configured to use the indices output by the TCAM 124 to retrieve the entries 144 from the RAM 140 that correspond to the indices.

The lookup engine 120 further comprises a controller 160. The controller 160 is configured to, when the TCAM 124 outputs multiple indices, analyze priority information 148 from the retrieved entries 144 to select one of the retrieved entries 144 having a highest priority level. The selected entry 144 includes a rule, and the lookup engine 120 is configured to provide to the processing engine 116 the rule from the selected entry 144.

As an illustrative example, the processing engine 116 comprises a Layer-3 forwarding engine and the RAM 140 stores rules having respective next-hop Internet Protocol (IP) addresses and/or indicators of next-hop network interfaces 104, according to some embodiments. In some such embodiments, the processing engine 116 is configured to generate the search key to include at least a destination IP address. When the TCAM 124 outputs multiple indices in response to a search key, the controller 160 analyzes priority information 148 from the retrieved entries 144 to select one of the retrieved entries 144 having a highest priority level. In an embodiment, each of retrieved entries 144 includes a next-hop IP address and/or network interface indicator, and the controller 160 effectively selects one of the next-hop IP addresses and/or network interface indicators using the priority information 148 from the retrieved entries 144.

As another illustrative example, the processing engine 116 comprises a classification engine and the RAM 140 stores rules having classification-related information such as flow identifiers (IDs) to be assigned to packets and optionally other classification-related information, such as one or more of VLAN IDs to be assigned to packets, etc. The processing engine 116 is configured to generate the search key to include network address information (e.g., one of, or any suitable combination of two or more of, a destination address, such as a destination media access control (MAC) address, a destination IP address, etc.; a source address, e.g., a source MAC address, a source IP address, etc.). In some embodiments, the processing engine 116 is configured to generate the search key to also include transmission control protocol (TCP) port information and/or user datagram protocol (UDP) port information (e.g., one of or any suitable combination of two or more of a TCP source port, a TCP destination port, a UDP source port, a UDP destination port). In some embodiments, the processing engine 116 is configured to generate the search key to additionally or alternatively include other header information such a VLAN ID, a protocol type, etc. In some embodiments, the processing engine 116 is configured to generate the search key to additionally or alternatively include metadata associated with the packet, such as an ID of a port or network interface 104 of the network device 100 that received the packet.

When the TCAM 124 outputs multiple indices in response to a search key, the controller 160 analyzes priority information 148 from the retrieved entries 144 to select one of the retrieved entries 144 having a highest priority level. In an embodiment, each of the retrieved entries 144 includes classification-related information, and the controller 160 effectively selects one set of classification-related information using the priority information 148 from the retrieved entries 144.

Figure 2:
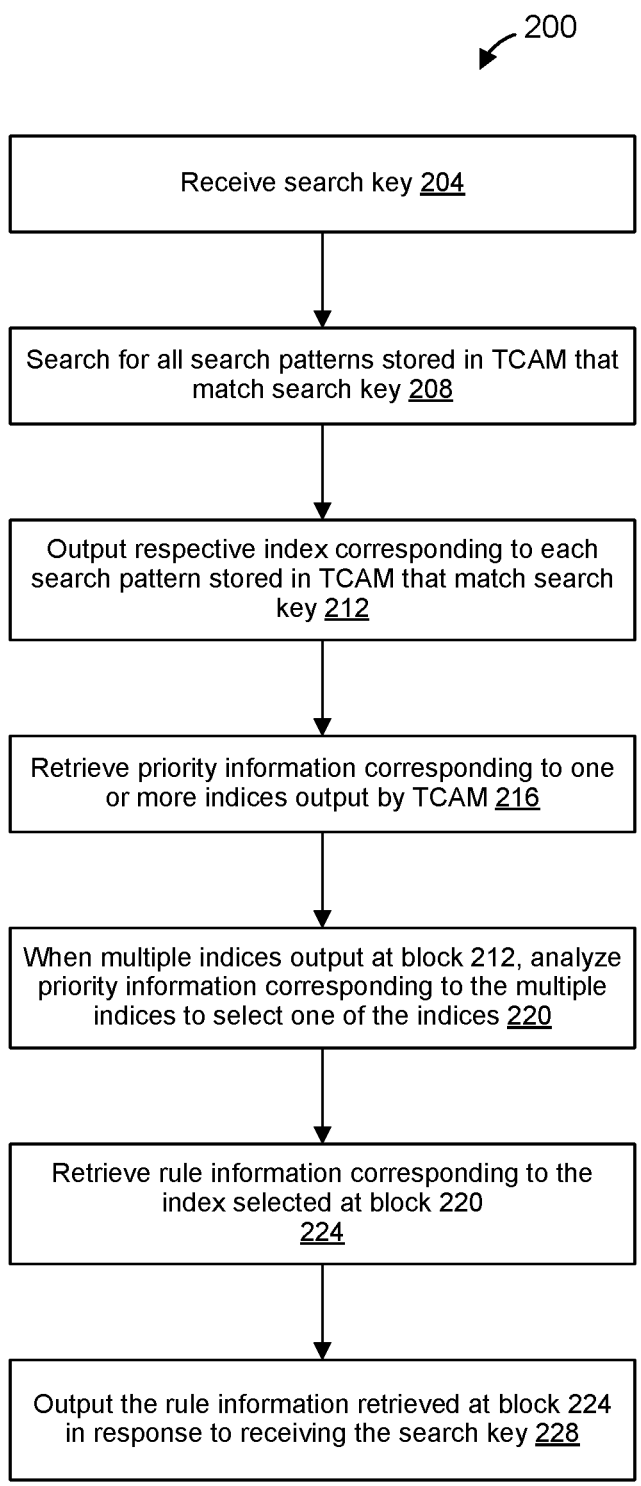
FIG. 2 is a flow diagram of an example method for retrieving information from a lookup table such as the lookup table of FIG. 1, according to an embodiment.

FIG. 2 is a flow diagram of an example method 200 for retrieving information from a lookup table, according to an embodiment. The method 200 is implemented by the example network device 100, according to some embodiments, and the method 200 is described with reference to FIG. 1 merely for illustrative purposes. In other embodiments, the method 200 is implemented by another suitable network device different than the network device 100. In some embodiments, the network device 100 implements another suitable method for retrieving information from the lookup table 120 that is different than the method 200.

At block 204, a lookup engine receives a search key. For example, the lookup engine 120 receives a search key from the processing engine 116.

At block 208, the TCAM compares the search key to all search patterns stored in the TCAM to find stored search patterns that match the search key. For example, the TCAM 124 searches for all search patterns in entries 128 of the TCAM 124 that match the search key.

At block 212, the TCAM outputs a respective index corresponding to each search pattern stored in the TCAM that match the search key. For example, the TCAM 124 outputs a respective index corresponding to each search pattern in a respective entry 128 of the TCAM 124 that match the search key.

At block 216, at least when the TCAM outputs multiple indices at block 212, the lookup engine retrieves respective priority information that correspond to the indices and that indicate respective priority levels that are independent from the physical locations of the matching search patterns within the TCAM. In an embodiment, the lookup engine retrieves the respective priority information from a first memory. The first memory is separate from the TCAM, according to an embodiment. For example, the controller 160 retrieves, from the RAM 140, respective priority information 148 corresponding to the indices output by the TCAM 124. FIG. 1 illustrates an example scenario in which the lookup engine 120 retrieves priority information 148-*i*, priority information 148-*k*, and priority information 148*k-s* of the RAM 140 corresponding to respective indices output by the TCAM 124.

At block 220, when the TCAM outputs multiple indices at block 212, the lookup engine analyzes priority information retrieved from a memory at block 216 to select one of the indices. For example, the lookup engine selects one of the indices that has a highest priority level. With network device 100 of FIG. 1, when the TCAM 124 outputs multiple indices the controller 160 analyzes priority information 148 retrieved from the RAM 140 to select one of the indices.

At block 224, the lookup engine retrieves rule information from a second memory that corresponds to the index selected at block 220, the second memory being separate from the TCAM. In an embodiment, the second memory that stores rule information is the same as the first memory that stores priority information. With network device 100 of FIG. 1, the controller 160 retrieves from the RAM 140 rule information from an entry 144 that corresponds to an index from the TCAM 124 that was selected by the controller 160.

At block 228, the rule information corresponding to the index selected at block 220 is output by the lookup engine in response to the search key received at block 204. For example, the controller 160 outputs rule information from an entry 144 in the RAM 140 that corresponds to the index selected by the controller 160.

In some embodiments in which the priority information and the rule information are stored in a same memory, such as with the network device 100, blocks 216 and 224 are combined. For example, when the TCAM outputs multiple indices at block 212, priority information and rule information corresponding to the multiple indices are retrieved from the same memory. Then, at block 228, the rule information corresponding to the selected index is output by the lookup engine in response to the search key received at block 204.

In other embodiments in which the priority information and the rule information are stored in a same memory, such as with the network device 100, blocks 216 and 224 are not combined. For example, when the TCAM outputs multiple indices at block 212, priority information corresponding to the multiple indices are retrieved from the same memory at block 216. Subsequently, at block 224, the rule information corresponding to the selected index is retrieved from the same memory.

Figure 3:
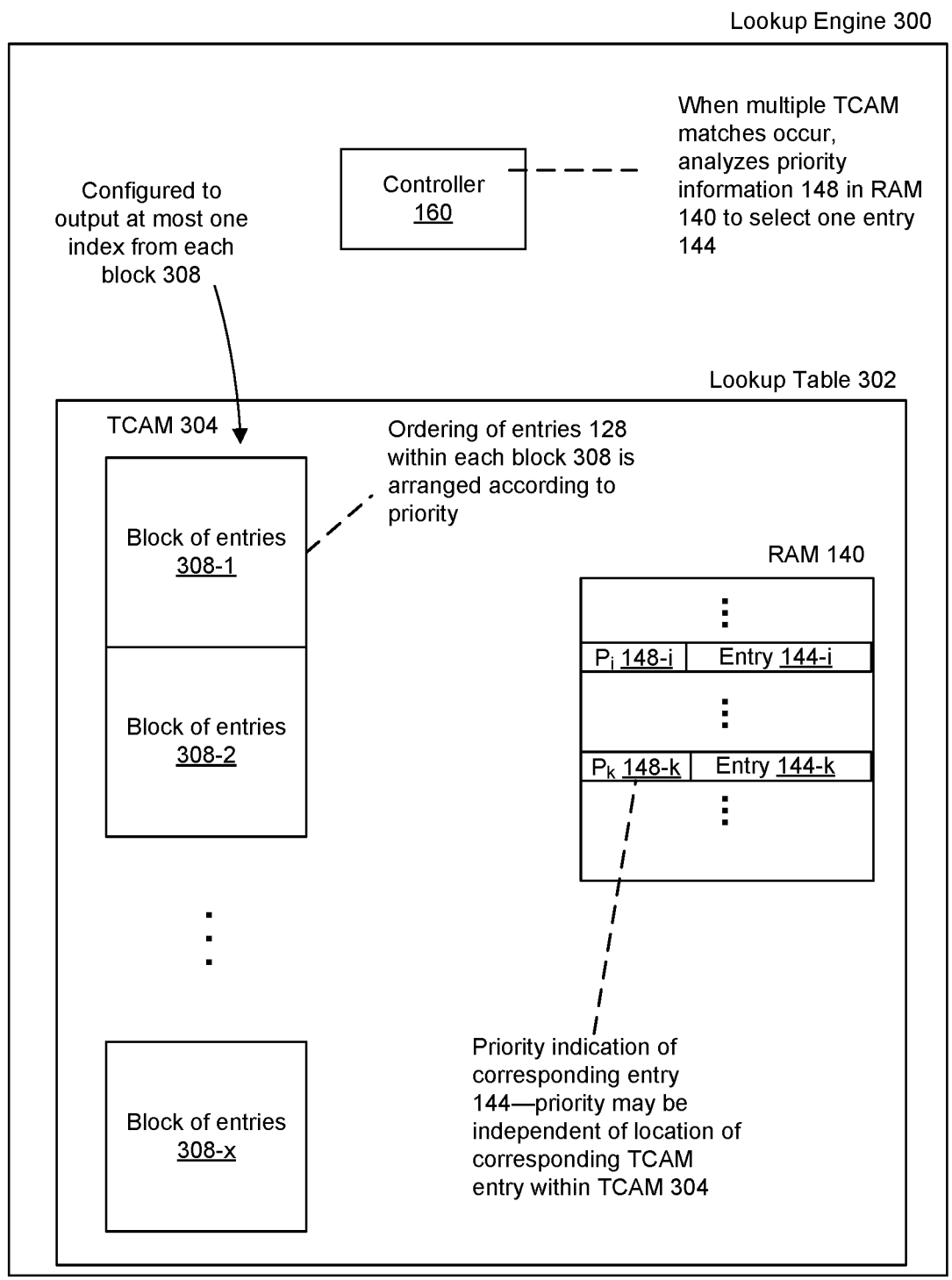
FIG. 3 is a simplified block diagram of an example lookup table that includes another example TCAM that is configured to output multiple match indices when a search key matches multiple search patterns stored in the TCAM, according to another embodiment.

FIG. 3 is a simplified block diagram of another example lookup engine 300 that is configured to store indications of actions to be performed by a network device on packets received by the network device, according to another embodiment. The lookup engine 300 is similar to the lookup engine 120 of FIG. 1 and includes elements that are the same or similar to like-numbered elements of the lookup engine 120 of FIG. 1. Like numbered elements are not discussed again in detail for purposes of brevity.

In some embodiments, the network device 100 of FIG. 1 utilizes the lookup engine 300 in addition to (for example, with another processing engine (not shown) different than the processing engine 116) or instead of the lookup engine 120. FIG. 3 is described with reference to FIG. 1 merely for illustrative purposes. In other embodiments, the lookup engine 300 is used with another suitable network device.

The lookup engine 300 includes a lookup table 302 that stores information similar to information stored in the lookup table 120 of FIG. 1. For example, the lookup table 302 stores information that indicates actions to be performed by the network device 100 on packets received by the network device 100, such as classifying packet as belonging to particular packet flows, classifying the packets as belonging to particular virtual local area networks (VLANs), forwarding the packets to particular network interfaces 104, determining that particular tunneling headers are to be added to the packets, etc.

The lookup table 302 includes a TCAM 304 that includes a plurality of entries organized in blocks 308. Similar to the TCAM 124 of FIG. 1, the entries of the TCAM 304 store search patterns. The lookup table 302 also includes the RAM 140. Similar to the lookup table 122 of FIG. 1, the RAM 140 includes a plurality of entries 144 that store rules associated with the search patterns stored in the TCAM 304. Each entry 144 of the RAM 140 also stores priority information 148. The priority information indicates a relative priority of the rule stored in the entry 144 with respect to other rules stored in other entries 144.

The lookup engine 300 is configured to apply a search key received from a processing engine of the network device as an input to the TCAM 304.

The TCAM 304 is configured to, in response to receiving a search key, search in each block of entries 308 for a search pattern that matches the search key taking into account an ordering of entries within the block of entries 308. If multiple entries within the block 308 match the search key, the TCAM outputs a single index corresponding to one of the matching entries that is highest in the ordering of entries within the block 308. In an embodiment, the TCAM 304 compares the search key to all entries in the block 308 concurrently.

Thus, the TCAM 304 is configured to output at most one index for each block 308, the index indicating a matching search pattern within the block 308. On the other hand, if the search key matches entries in multiple blocks 308, the TCAM 304 is configured to output multiple indices indicating respective entries in respective blocks 308.

When the TCAM 308 determines that the search key only matches a search pattern stored store in one block 308, the TCAM 304 outputs a single index that indicates the single entry. The single index output by the TCAM 304 corresponds to one of the entries 144 of the RAM 140, and the lookup engine 300 uses the index to retrieve the one entry 144 from the RAM 140. The one entry 144 includes a rule corresponding to the single entry of the TCAM 304 that matches the search key, and the lookup engine 300 is configured to provide to the processing engine 116 the rule that was retrieved from the one entry 144 of the RAM 140.

On the other hand, when the TCAM 124 determines that the search key matches multiple entries in respective blocks 308, the TCAM 304 outputs multiple indices that that indicate respective entries that match the search key. Similar to the lookup engine 120 of FIG. 1, each index output by the TCAM 304 corresponds to a respective entry 144 of the RAM 140.

The lookup engine 300 is configured to use the indices output by the TCAM 304 to retrieve the entries 144 from the RAM 140 that correspond to the indices.

The controller 160 is configured to, when the TCAM 304 outputs multiple indices, analyze priority information 148 from the retrieved entries 144 to select one of the retrieved entries 144 having a highest priority level. The selected entry 144 includes a rule, and the lookup engine 120 is configured to provide to the processing engine 116 the rule from the selected entry 144.

Figure 4:
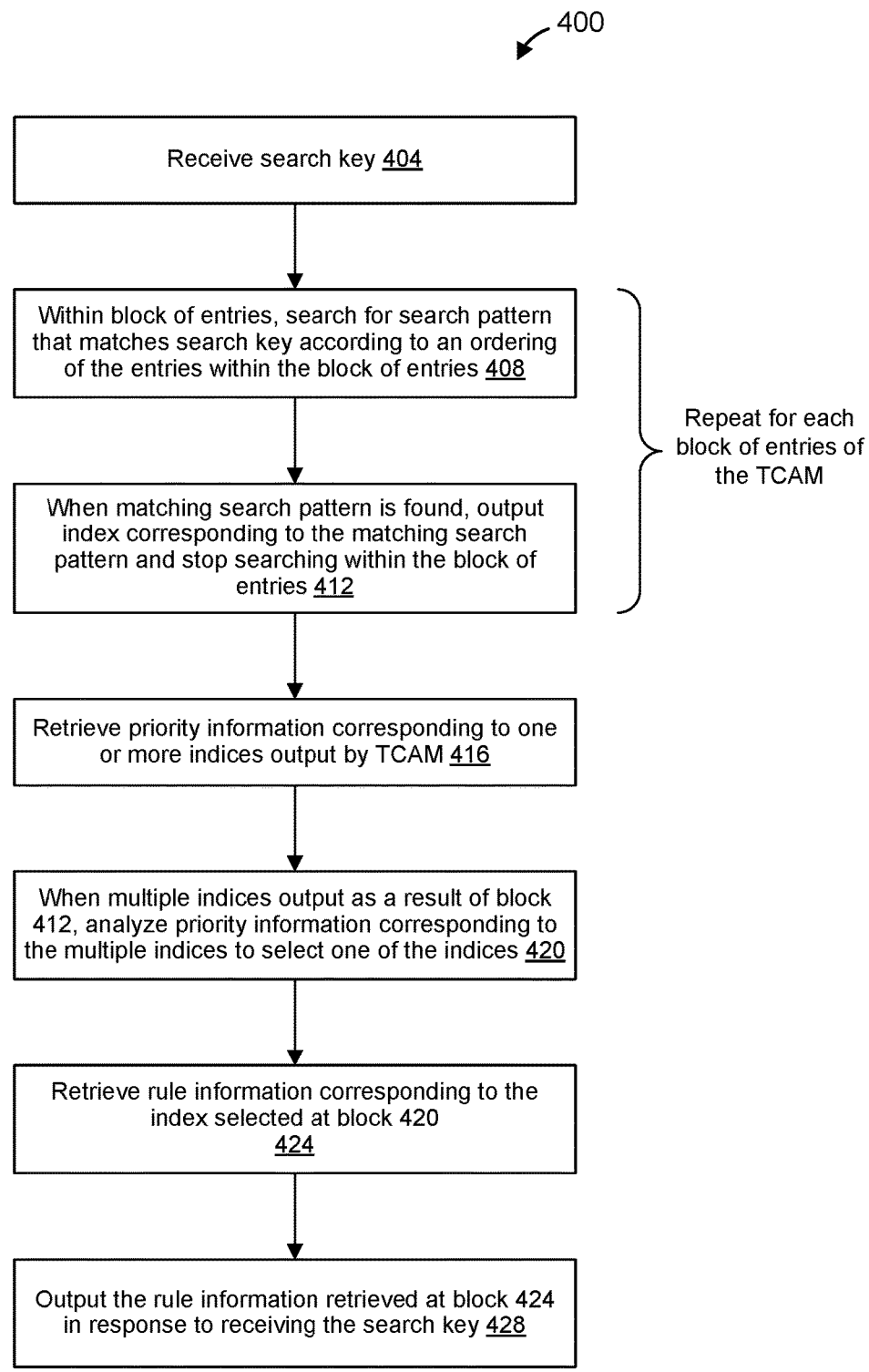
FIG. 4 is a flow diagram of an example method for retrieving information from a lookup table such as the lookup table of FIG. 3, according to an embodiment.

FIG. 4 is a flow diagram of another example method 400 for retrieving information from a lookup table, according to another embodiment. The method 400 is implemented by an example network device having the lookup engine 300 of FIG. 3, according to some embodiments, and the method 400 is described with reference to FIGS. 1 and 3 merely for illustrative purposes. In other embodiments, the method 300 is implemented by another suitable network device different than the network device 100 (modified to use the lookup engine 300) and/or with a suitable lookup engine different than the lookup engine 300. For example, the method 400 is implemented by the network 100 (or another suitable network device) that uses another suitable lookup table having a TCAM that includes entries arranged as blocks, where the TCAM can output at most one match index per block, but can output multiple match indices from multiple blocks.

In some embodiments, the network device 100 (modified to use the lookup engine 300) implements another suitable method for retrieving information from the lookup table 302 that is different than the method 400.

At block 404, the lookup engine receives a search key. For example, the lookup engine 300 receives a search key from the processing engine 116.

At block 408, the TCAM compares the search key received at block 404 with search patterns store in respective entries within a block of entries, taking into account an ordering of entries within the block of entries. For example, the TCAM 304 searches within a block 308, taking into account an ordering of entries within the block 308, for search patterns that match the search key received at block 404. In an embodiment, the TCAM compares the search key to all of the entries in the block concurrently.

At block 412, when the TCAM detects a match of one or more search patterns stored in the block of entries, the TCAM outputs a single index corresponding to one entry within the block that matches the search key. When the TCAM detects a match of multiple search patterns that match the search key within the block of entries, the TCAM selects one of the matching search patterns that is highest in the ordering of entries. For example, when the TCAM 304 detects a match of multiple search patterns stored in the block 308 with the search key, the TCAM 304 outputs one index corresponding to the entry storing a matching search pattern that is highest in the ordering of entries within the block 308.

Blocks 408 and 412 are repeated for each of multiple blocks of entries within the TCAM. In an embodiment, the "repeated" performance of blocks 408 and 412 is done concurrently. For example, the TCAM is configured to compare the search key to entries in multiple blocks concurrently, according to some embodiments.

At block 416, at least when the TCAM outputs multiple indices in connection with performing the acts of block 412 for multiple blocks of entries within the TCAM (i.e., because matching search patterns were found in multiple blocks of entries), the lookup engine retrieves respective priority information that corresponds to the indices indicative of TCAM entries that match the search key and that indicate respective priority levels that are independent from the physical locations of the matching search patterns within the TCAM. In an embodiment, the lookup engine retrieves the respective priority information from a first memory. The first memory is separate from the TCAM, according to an embodiment. For example, the controller 160 retrieves, from the RAM 140, respective priority information 148 corresponding to the indices output by the TCAM 304.

At block 420, when the TCAM outputs multiple indices in connection with performing the acts of block 412 for multiple blocks of entries of the TCAM (i.e., because matching search patterns were found in multiple blocks of entries), the lookup engine analyzes priority information retrieved from a memory at block 416 to select one of the indices. For example, the lookup engine selects one of the indices that has a highest priority level. With the example lookup engine 300 of FIG. 3, when the TCAM 304 outputs multiple indices the controller 160 analyzes priority information 148 retrieved from the RAM 140 to select one of the indices.

At block 424, the lookup engine retrieves rule information from a second memory that corresponds to the index selected at block 420, the second memory being separate from the TCAM. In an embodiment, the second memory that stores rule information is the same as the first memory that stores priority information. With lookup engine 300 of FIG. 3, the controller 160 retrieves from the RAM 140 rule information from an entry 144 that corresponds to an index from the TCAM 124 that was selected by the controller 160.

At block 428, the rule information corresponding to the index selected at block 420 is output by the lookup engine in response to the search key received at block 404. For example, the controller 160 outputs rule information from an entry 144 in the RAM 140 that corresponds to the index selected by the controller 160.

In some embodiments in which the priority information and the rule information are stored in a same memory, such as with the lookup engine 300, blocks 416 and 424 are combined. For example, when the TCAM outputs multiple indices in connection with performing the acts of block 412 for multiple blocks of entries of the TCAM, priority information and rule information corresponding to the multiple indices are retrieved from the same memory. Then, at block 428, the rule information corresponding to the selected index is output by the lookup engine in response to the search key received at block 404.

In other embodiments in which the priority information and the rule information are stored in a same memory, such as with the lookup engine 300, blocks 416 and 424 are not combined. For example, when the TCAM outputs multiple indices in connection with performing the acts of block 412 for multiple blocks of entries of the TCAM, priority information corresponding to the multiple indices are retrieved from the same memory at block 416. Subsequently, at block 424, the rule information corresponding to the selected index is retrieved from the same memory.

Figure 5:
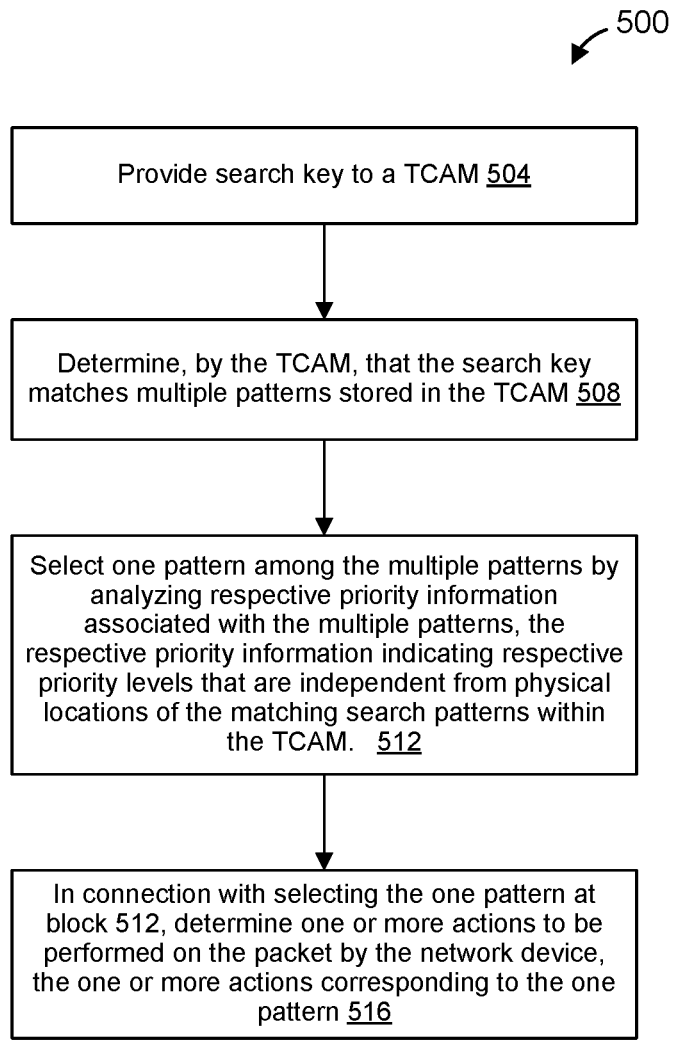
FIG. 5 is a flow diagram of an example method for determining actions to be performed on packets by a network device, according to an embodiment.

FIG. 5 is a flow diagram of an example method 500 for determining actions to be performed on packets by a network device, according to an embodiment. The method 500 is implemented by the example network device 100, according to an embodiment. The method 500 is implemented by a network device having the lookup engine 300 of FIG. 3, according to another embodiment. For example, the method 500 is implemented by the network device 100 modified to use the lookup engine 300, according to an embodiment. The method 500 is described with reference to FIGS. 1 and 3 merely for illustrative purposes. In other embodiments, the method 500 is implemented by another suitable network device different than the network device 100 of FIG. 1 and the network device 100 modified to use the lookup engine 300.

In some embodiments, the network device 100 implements another suitable method for determining actions to be performed on packets different than the method 500. In some embodiments, the network device 100, modified to use the lookup engine 300, implements another suitable method for determining actions to be performed on packets different than the method 500.

At block 504, a packet processor of the network device provides a search key corresponding to a packet to a TCAM. For example, the processing engine 116 provides the search key to the TCAM 124, in an embodiment. As another example, processing engine 116 provides the search key to the TCAM 304, in another embodiment.

At block 508, the TCAM determines that the search key matches multiple search patterns stored in the TCAM. For example, the TCAM 124 determines that the search key matches multiple search patterns stored in the TCAM 124, in an embodiment. As another example, the TCAM 304 determines that the search key matches multiple patterns stored in the TCAM 304, in an embodiment.

At block 512, one search pattern among the multiple search patterns is selected at least by analyzing respective priority information associated with the multiple search patterns. The respective priority information indicate respective priority levels that are independent from the physical locations of the matching search patterns within the TCAM. The respective priority information is stored in respective entries (within a first memory) associated with the multiple search patterns, according to an embodiment. The respective entries storing priority information are within a first memory configured to store priority information corresponding to the multiple search patterns stored in the TCAM, in an embodiment. For example, the controller 160 selects one search pattern among the multiple search patterns using priority information 148 associated with the multiple search patterns.

At block 516, in connection with selecting the one search pattern, one or more actions to be performed on the packet by the network device are determined, the one or more actions corresponding to the one search pattern. In an embodiment, block 512 includes retrieving, from an entry (within a second memory) corresponding to the one search pattern, rule information corresponding to the one search pattern. The entry storing rule information is within a second memory configured to store, in respective entries of the second memory, rule information corresponding to the multiple search patterns stored in the TCAM, in an embodiment.

In an embodiment, the first memory that stores priority information corresponding to the multiple search patterns stored in the TCAM is the same as the second memory that stores rule information corresponding to the multiple search patterns stored in the TCAM. For example, each entry of the same memory stores i) priority information corresponding to a respective search pattern in the TCAM, and ii) rule information corresponding to the respective search pattern in the TCAM.

As an illustrative example, block 512 includes the controller 160 retrieving, from an entry 144 corresponding to the one search pattern in the TCAM 124/304, rule information corresponding to the one search pattern in the TCAM 124/304.

Although in embodiments described above priority information is stored in a memory separate from the TCAM (e.g., in the RAM 140), in other embodiments, the priority information is stored in the TCAM. In some such embodiments, each of at least some entries of the TCAM includes i) a first field for storing a search pattern, and ii) a second field for storing priority information corresponding to the search pattern in the first field. In some such embodiments, when comparing a search key to search patterns in the TCAM, the TCAM does not compare the search key to data in the second fields, e.g., the priority information. In some such embodiments, at least when the TCAM determines that the search key matches multiple search patterns stored in the TCAM, the TCAM outputs respective priority information stored in the entries of the TCAM (i.e., respective priority information in respective second fields) having the matching search patterns (i.e., in respective first fields), and the controller 160 uses the priority information output by the TCAM to select one of the search patterns according to techniques such as described above.

Embodiment 1: A network device, comprising: a packet processor configured to process packets communicated over a network, the processing including generating a search key representative of a packet, the search key including header information retrieved from the packet; and a lookup engine coupled to the processing processor. The lookup engine includes: a ternary content addressable memory (TCAM) configured to store a plurality of search patterns, the TCAM further configured to i) receive the search key from the processing engine, ii) compare the search key to the plurality of search patterns, and iii) in response to determining that the search key matches one or more search patterns stored in the TCAM, generate one or more indices corresponding to the one or more search patterns that match the search key; and a controller configured to: select one search pattern, from among the one or more search patterns, at least by analyzing respective priority information associated with the one or more search patterns, the respective priority information indicating one or more respective priority levels that are independent from one or more physical locations of the one or more search patterns within the TCAM, and in connection with selecting the one search pattern, retrieve from a memory separate from the TCAM a processing rule that corresponds to the one selected search pattern and provide the processing rule to the packet processor to process the packet according to the processing rule.

Embodiment 2: The network device of embodiment 1, wherein the memory separate from the TCAM comprises a first memory and a second memory, and wherein the controller is configured to: select the one search pattern at least by analyzing respective priority information retrieved from the first memory; and retrieve from the second memory the processing rule that corresponds to the one selected search pattern.

Embodiment 3: The network device of embodiment 1, wherein the memory separate from the TCAM comprises a random access memory (RAM), and wherein the controller is configured to: select the one search pattern at least by analyzing respective priority information retrieved from the RAM; and retrieve from the RAM the processing rule that corresponds to the one selected search pattern.

Embodiment 4: The network device of embodiment 1, wherein: the memory separate from the TCAM comprises a plurality of entries corresponding to respective search patterns stored in the TCAM; and each of at least some of the entries includes i) priority information corresponding to a respective search pattern stored in the TCAM, and ii) rule information corresponding to the respective search pattern stored in the TCAM.

Embodiment 5: The network device of embodiment 1, wherein: the TCAM comprises a plurality of entries, each of at least some of the entries including i) a respective first field configured to store a respective search pattern, and ii) a respective second field configured to store respective priority information corresponding to the respective search pattern in the first field; the TCAM is configured to compare the search key to the search patterns stored in the first fields of the TCAM; and the controller is configured to: retrieve the respective priority information associated with the one or more search patterns from one or more second fields of the TCAM that correspond to the one or more search patterns that match the search key.

Embodiment 6: The network device of any of embodiments 1-5, wherein the controller is configured to: select the one search pattern associated with a highest priority level among the multiple search patterns, wherein the highest priority level is determined by the controller based on the respective priority information.

Embodiment 7: The network device of any of embodiments 1-6, wherein: the TCAM comprises a plurality of entries organized in a plurality of groups of multiple entries; and the TCAM is configured to generate at most one index for each group of multiple entries, the at most one index indicating at most one search pattern in the corresponding group of multiple entries that matches the search key.

Embodiment 8: The network device of any of embodiments 1-7, wherein: the TCAM comprises a plurality of entries organized in a plurality of groups of multiple entries; the TCAM is configured to, for each group of multiple entries: compare the search key to search patterns stored within entries of the group, and when the search key matches multiple search patterns in the group, select one search pattern based on an ordering of entries within the group, and output a single index for the group that indicates the selected search pattern; and the controller is configured to, when the TCAM generates multiple indices corresponding to matches in multiple groups of entries, select one of the indices, at least by analyzing respective priority information associated with the multiple indices, the respective priority information indicating one or more respective priority levels that are independent from respective physical locations of the TCAM that correspond to the multiple indices.

Embodiment 9: The network device of any of embodiments 1-8, wherein: the memory separate from the TCAM stores processing rules having forwarding information for forwarding packets that were received by the network device; and the packet processor is configured to use forwarding information received from the lookup engine to determine network interfaces of, or coupled to, the network device to which the packets are to be forwarded for transmission.

Embodiment 10: The network device of any of embodiments 1-8, wherein: the memory separate from the TCAM stores processing rules having classification information for classifying packets that were received by the network device; and the packet processor is configured to use classification information received from the lookup engine to classify packets that were received by the network device.

Embodiment 11: A method for determining actions to be performed on packets by a network device, the method comprising: providing a search key corresponding to a packet to a ternary content addressable memory (TCAM); determining, by the TCAM, that the search key matches one or more search patterns stored in the TCAM; selecting, by the network device, one search pattern among the one or more search patterns at least by analyzing respective priority information associated with the one or more search patterns, the respective priority information indicating one or more respective priority levels that are independent from one or more physical locations of the one or more search patterns within the TCAM; and in connection with selecting the one search pattern, determining, by the network device, one or more actions to be performed on the packet by the network device, the one or more actions corresponding to the selected one search pattern.

Embodiment 12: The method for determining actions to be performed on packets of embodiment 11, wherein: selecting the one search pattern among the one or more search patterns at least by analyzing respective priority information associated with the one or more search patterns comprises retrieving the respective priority information from respective entries in a first memory that stores respective priority information corresponding to respective search patterns stored in the TCAM; and determining the one or more actions to be performed on the packet by the network device comprises retrieving rule information from an entry in a second memory that corresponds to the selected one search pattern, the second memory storing respective rule information corresponding to the plurality of search patterns stored in the TCAM, the respective rule information indicating respective one or more actions to be performed on a packet.

Embodiment 13: The method for determining actions to be performed on packets of embodiment 11, wherein: selecting the one search pattern among the one or more search patterns at least by analyzing respective priority information associated with the one or more search patterns comprises retrieving the respective priority information from respective entries in a memory separate from the TCAM; and determining the one or more actions to be performed on the packet by the network device comprises retrieving rule information from an entry in the memory that also stores the priority information corresponding to the selected one search pattern.

Embodiment 14: The method for determining actions to be performed on packets of embodiment 13, wherein: selecting the one search pattern among the one or more search patterns at least by analyzing respective priority information associated with the one or more search patterns comprises retrieving the respective priority information from respective entries in a random access memory (RAM); and determining the one or more actions to be performed on the packet by the network device comprises retrieving rule information from an entry in the RAM that also stores the priority information corresponding to the selected one search pattern.

Embodiment 15: The method for determining actions to be performed on packets of embodiment 11, wherein: the TCAM comprises a plurality of entries, each of at least some of the entries including i) a respective first field configured to store a respective search pattern, and ii) a respective second field configured to store respective priority information corresponding to the respective search pattern in the first field; determining that the search key matches one or more search patterns stored in the TCAM comprises comparing, by the TCAM, the search key to the search patterns stored in the first fields of the TCAM; and selecting one search pattern comprises retrieving the respective priority information associated with the one or more search patterns from one or more second fields of the TCAM that correspond to the one or more search patterns that match the search key.

Embodiment 16: The method for determining actions to be performed on packets of any of embodiments 11-15, further comprising: determining one search pattern associated with a highest priority level among the multiple search patterns based on the priority information; wherein selecting the one search pattern at least by analyzing the respective priority information associated with the multiple search patterns comprises selecting the one search pattern associated with the highest priority level among the multiple search patterns.

Embodiment 17: The method for determining actions to be performed on packets of any of embodiments 11-16, wherein the TCAM comprises a plurality of entries organized in a plurality of groups of multiple entries, and wherein the method further comprises: comparing, by the TCAM, the search key to search patterns stored within entries of the group; when the search key matches multiple search patterns in the group, selecting, by the TCAM, one search pattern based on an ordering of entries within the group, and outputting, by the TCAM, a single index for the group that indicates the selected search pattern; and when the TCAM outputs multiple indices corresponding to matches in multiple groups of entries, selecting, by the network device, one of the indices at least by analyzing respective priority information associated with the multiple indices, the respective priority information indicating one or more respective priority levels that are independent from respective physical locations of the TCAM that correspond to the multiple indices.

Embodiment 18: The method for determining actions to be performed on packets of any of embodiments 11-17, wherein the TCAM comprises a plurality of entries organized in a plurality of groups of multiple entries, and the method further comprises: generating, by the TCAM, at most one index for each group of multiple entries, the at most one index indicating at most one search pattern in the corresponding group of multiple entries that matches the search key.

Embodiment 19: The method for determining actions to be performed on packets of any of embodiments 11-18, further comprising: for each of at least some packets received by the network device, generating a search key to include header information retrieved from the packet.

Embodiment 20: The method for determining actions to be performed on packets of embodiment 19, wherein generating the search key comprises generating the search key to further include metadata corresponding to the packet.

Embodiment 21: The method for determining actions to be performed on packets of embodiment 20, wherein generating the search key comprises generating the search key to further include an indicator of a network interface of the network device that received the packet.

Embodiment 22: The method for determining actions to be performed on packets of any of embodiments 11-21, wherein: the memory separate from the TCAM stores processing rules having forwarding information for forwarding packets that were received by the network device; and determining the one or more actions to be performed on the packet by the network device comprises using, by the network device, forwarding information received from the lookup engine to determine network interfaces of, or coupled to, the network device to which the packets are to be forwarded for transmission.

Embodiment 23: The method for determining actions to be performed on packets of any of embodiments 11-22, wherein: the memory separate from the TCAM stores processing rules having classification information for classifying packets that were received by the network device; and determining the one or more actions to be performed on the packet by the network device comprises using, by the network device, classification information received from the lookup engine to classify packets that were received by the network device.

At least some of the various blocks, operations, and techniques described above are suitably implemented utilizing dedicated hardware, such as one or more of discrete components, an integrated circuit, an application-specific integrated circuit (ASIC), a programmable logic device (PLD), a processor executing firmware instructions, a processor executing software instructions, or any combination thereof. When implemented utilizing a processor executing software or firmware instructions, the software or firmware instructions may be stored in any suitable computer readable memory such a read-only memory (ROM), a random-access memory (RAM), etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A network device, comprising:
   a packet processor configured to process packets communicated over a network, the processing including generating a search key representative of a packet, the search key including header information retrieved from the packet; and
   a lookup engine coupled to the packet processor, the lookup engine comprising:
      a ternary content addressable memory (TCAM) configured to store a plurality of search patterns, the TCAM further configured to i) receive the search key from the packet processor, ii) compare the search key to the plurality of search patterns, and iii) in response to determining that the search key matches one or more search patterns stored in the TCAM, generate one or more indices corresponding to the one or more search patterns that match the search key;
      a memory separate from the TCAM; and
      a controller configured to:
         retrieve from the memory separate from the TCAM respective priority information associated with the one or more search patterns, the respective priority information indicating one or more respective priority levels that are independent from one or more physical locations of the one or more search patterns within the TCAM, select one search pattern, from among the one or more search patterns, at least by analyzing the respective priority information associated with the one or more search patterns, and in connection with selecting the one search pattern, retrieve from the memory separate from the TCAM a processing rule that corresponds to the one selected search pattern and provide the processing rule to the packet processor to process the packet according to the processing rule.

2. The network device of claim 1, wherein the memory separate from the TCAM comprises a first memory and a second memory, and wherein the controller is configured to:

select the one search pattern at least by analyzing respective priority information retrieved from the first memory; and retrieve from the second memory the processing rule that corresponds to the one selected search pattern.

3. The network device of claim 1, wherein the memory separate from the TCAM comprises a random access memory (RAM), and wherein the controller is configured to:

select the one search pattern at least by analyzing respective priority information retrieved from the RAM; and retrieve from the RAM the processing rule that corresponds to the one selected search pattern.

4. The network device of claim 1, wherein:

the memory separate from the TCAM comprises a plurality of entries corresponding to respective search patterns stored in the TCAM; and each of at least some of the entries includes i) priority information corresponding to a respective search pattern stored in the TCAM, and ii) rule information corresponding to the respective search pattern stored in the TCAM.

5. The network device of claim 1, wherein the controller is configured to:

when the search key matches multiple search patterns stored in the TCAM, select ene search pattern associated with a highest priority level among the multiple search pattern, wherein the highest priority level is determined by the controller based on the respective priority information retrieved from the memory separate from the TCAM.

6. The network device of claim 1, wherein:

the TCAM comprises a plurality of entries organized in a plurality of groups of multiple entries; and the TCAM is configured to generate at most one index for each group of multiple entries, the at most one index indicating at most one search pattern in the corresponding group of multiple entries that matches the search key.

7. The network device of claim 1, wherein:

the TCAM comprises a plurality of entries organized in a plurality of groups of multiple entries;

the TCAM is configured to, for each group of multiple entries:

compare the search key to search patterns stored within entries of the group, and when the search key matches multiple search patterns in the group, select one search pattern based on an ordering of entries within the group, and output a single index for the group that indicates the selected search pattern; and the controller is configured to, when the TCAM generates multiple indices corresponding to matches in multiple groups of entries, select one of the indices, at least by analyzing respective priority information i) retrieved from the memory separate from the TCAM and ii) associated with the multiple indices, the respective priority information associated with the multiple indices indicating one or more respective priority levels that are independent from respective physical locations of the TCAM that correspond to the multiple indices.

8. The network device of claim 1, wherein:

the memory separate from the TCAM stores processing rules having forwarding information for forwarding packets that were received by the network device; and the packet processor is configured to use forwarding information received from the lookup engine to determine network interfaces of, or coupled to, the network device to which the packets that were received by the network device are to be forwarded for transmission.

9. The network device of claim 1, wherein:

the memory separate from the TCAM stares processing rules having classification information for classifying packets that were received by the network device; and the packet processor is configured to use classification information received from the lookup engine to classify packets that were received by the network device.

10. A method for determining actions to be performed on packets by a network device, the method comprising:

providing a search key corresponding to a packet to a ternary content addressable memory (TCAM);

determining, by the TCAM, that the search key matches one or more search patterns stored in the TCAM;

retrieving respective priority information associated with the one or more search patterns from respective entries in a memory separate from the TCAM, the respective priority information indicating one or more respective priority levels that are independent from one or more physical locations of the one or more search patterns within the TCAM;

selecting, by the network device, one search pattern among the one or more search patterns at least by analyzing the respective priority information associated with the one or more search patterns; and in connection with selecting the one search pattern, determining, by the network device, one or more actions to be performed on the packet by the network device, the one or more actions corresponding to the selected one search pattern.

11. The method for determining actions to be performed on packets of claim 10, wherein:

the memory separate from the TCAM comprises i) a first memory that stores respective priority information corresponding to respective search patterns stored in the TCAM, and ii) a second memory that stores respective rule information corresponding to the plurality of search patterns stored in the TCAM, the respective rule information indicating respective one or more actions to be performed on a packet;

retrieving respective priority information associated with the one or more search patterns from respective entries in the memory separate from the TCAM comprises retrieving the respective priority information from respective entries in the first memory; and determining the one or more actions to be performed on the packet by the network device comprises retrieving rule information from an entry in the second memory that corresponds to the selected one search pattern.

12. The method for determining actions to be performed on packets of claim 10, wherein:
  determining the one or more actions to be performed on the packet by the network device comprises retrieving rule information from an entry in the memory separate from the TCAM that also stares the priority information corresponding to the selected one search pattern.

13. The method for determining actions to be performed on packets of claim 12, wherein:
  retrieving respective priority information associated with the one or more search patterns from respective entries in the memory separate from the TCAM comprises retrieving the respective priority information from respective entries in a random access memory (RAM) separate from the TCAM; and
  determining the one or more actions to be performed on the packet by the network device comprises retrieving rule information from an entry in the RAM that also stores the priority information corresponding to the selected one search pattern.

14. The method for determining actions to be performed on packets of claim 10, further comprising, when the search key matches multiple search patterns stored in the TCAM:
  determining one search pattern associated with a highest priority level among the multiple search patterns based on the priority information retrieved from the memory separate from the TCAM;
  wherein selecting the one search pattern at least by analyzing the respective priority information associated with the multiple search patterns comprises selecting the one search pattern associated with the highest priority level among the multiple search patterns.

15. The method for determining actions to be performed on packets of claim 10, wherein the TCAM comprises a plurality of entries organized in a plurality of groups of multiple entries, and wherein the method further comprises:
  comparing, by the TCAM, the search key to search patterns stored within entries of a group among the plurality of groups;
  when the search key matches multiple search patterns in the group, selecting, by the TCAM, one search pattern based on an ordering of entries within the group, and outputting, by the TCAM, a single index for the group that indicates the selected search pattern; and
  when the TCAM outputs multiple indices corresponding to matches in multiple groups of entries, selecting, by the network device, one of the indices at least by analyzing respective priority information i) retrieved from the memory separate from the TCAM and ii) associated with the multiple indices, the respective priority information indicating one or more respective priority levels that are independent from respective physical locations of the TCAM that correspond to the multiple indices.

16. The method for determining actions to be performed on packets of claim 10, wherein the TCAM comprises a plurality of entries organized in a plurality of groups of multiple entries, and the method further comprises:
  generating, by the TCAM, at most one index for each group of multiple entries, the at most one index indicating at most one search pattern in the corresponding group of multiple entries that matches the search key.

17. The method for determining actions to be performed on packets of claim 10, further comprising:
  for each of at least some packets received by the network device, generating a search key to include header information retrieved from the packet.

18. The method for determining actions to be performed on packets of claim 17, wherein generating the search key comprises generating the search key to further include metadata corresponding to the packet.

19. The method for determining actions to be performed on packets of claim 18, wherein generating the search key comprises generating the search key to further include an indicator of a network interface of the network device that received the packet.

20. The method for determining actions to be performed on packets of claim 10, wherein:
  the memory separate from the TCAM stares processing rules having forwarding information for forwarding packets that were received by the network device; and
  determining the one or more actions to be performed on the packet by the network device comprises using, by the network device, forwarding information retrieved from the memory separate from the TCAM to determine network interfaces to which the packets are to be forwarded for transmission, the network interfaces of, or coupled to, the network device.

21. The method for determining actions to be performed on packets of claim 10, wherein:
  the memory separate from the TCAM stares processing rules having classification information for classifying packets that were received by the network device; and
  determining the one or more actions to be performed on the packet by the network device comprises using, by the network device, classification information retrieved from the memory separate from the TCAM to classify packets that were received by the network device.

* * * * *